United States Patent
Liu et al.

(10) Patent No.: US 10,108,668 B2
(45) Date of Patent: Oct. 23, 2018

(54) COLUMN SMART MECHANISM FOR COLUMN BASED DATABASE

(71) Applicant: SAP SE, Walldorf (DE)

(72) Inventors: Yingqiao Liu, Shanghai (CN); Lin Zhu, Shanghai (CN); Huayang Jiang, Shanghai (CN)

(73) Assignee: SAP SE, Walldorf (DE)

( * ) Notice: Subject to any disclaimer, the term of this patent is extended or adjusted under 35 U.S.C. 154(b) by 549 days.

(21) Appl. No.: 13/729,632

(22) Filed: Dec. 28, 2012

(65) Prior Publication Data

US 2014/0172776 A1    Jun. 19, 2014

(51) Int. Cl.
*G06F 17/30* (2006.01)

(52) U.S. Cl.
CPC ................... *G06F 17/3048* (2013.01)

(58) Field of Classification Search
CPC ................... G06F 17/00; G06F 17/30
See application file for complete search history.

(56) References Cited

U.S. PATENT DOCUMENTS

| | | | | |
|---|---|---|---|---|
| 5,794,228 A * | 8/1998 | French | ............... | G06F 17/30315 |
| 5,794,229 A * | 8/1998 | French | ............... | G06Q 40/00 |
| 5,918,225 A * | 6/1999 | White | ............... | G06F 17/30324 |
| 6,542,895 B1 * | 4/2003 | DeKimpe | ............... | G06F 17/30595 |
| 6,546,395 B1 * | 4/2003 | DeKimpe | ............... | G06F 17/30592 |
| 8,086,598 B1 * | 12/2011 | Lamb | ............... | G06F 17/30466 |
| | | | | 707/606 |
| 8,671,091 B2 * | 3/2014 | Cherniack | ............... | G06F 17/30457 |
| | | | | 707/606 |
| 8,762,407 B2 * | 6/2014 | Wang | ............... | G06F 17/30592 |
| | | | | 707/600 |
| 2003/0217033 A1 * | 11/2003 | Sandler | ............... | G06F 17/30333 |
| 2009/0299767 A1 * | 12/2009 | Michon | ............... | G06Q 50/22 |
| | | | | 705/3 |
| 2011/0252073 A1 * | 10/2011 | Pauly | ............... | G06F 17/30091 |
| | | | | 707/812 |
| 2012/0239609 A1 * | 9/2012 | Zhao | ............... | G06Q 10/0637 |
| | | | | 707/600 |

(Continued)

OTHER PUBLICATIONS

Plattner, Hasso. "A common database approach for OLTP and OLAP using an in-memory column database." Proceedings of the 2009 ACM SIGMOD International Conference on Management of data. ACM, 2009, pp. 1-7.*

(Continued)

*Primary Examiner* — Farhan M Syed
(74) *Attorney, Agent, or Firm* — Jones Day

(57) ABSTRACT

Embodiments of the present disclosure may provide a system and method for processing an online transactional processing (OLTP) transaction on a column-based storage of a database. The method may include receiving a request of the OLTP transaction to access data on the column-based storage. A determination may be made whether a cache associated with the database includes column information for the OLTP transaction. If the cache includes the column information for the OLTP transaction, the method may include processing the OLTP transaction with the column information in the cache. If the cache does not include the column information for the OLTP transaction, the method may include selecting columns from the column-based storage of the database.

19 Claims, 3 Drawing Sheets

(56) References Cited

U.S. PATENT DOCUMENTS

| | | | | |
|---|---|---|---|---|
| 2013/0110764 | A1* | 5/2013 | Wilf | G06F 17/30592 707/600 |
| 2013/0117242 | A1* | 5/2013 | Kassner | G06F 17/30569 707/693 |
| 2013/0179244 | A1* | 7/2013 | Laffoon | H04L 63/0823 705/14.23 |
| 2013/0275364 | A1* | 10/2013 | Wang | G06F 17/30592 707/602 |

OTHER PUBLICATIONS

Cao, Yu, Chun Chen, Fei Guo, Dawei Jiang, Yuting Lin, Beng Chin Ooi, Hoang Tam Vo, Sai Wu, and Quanqing Xu. "ES 2: A cloud data storage system for supporting both OLTP and OLAP." In Data Engineering (ICDE), 2011 IEEE 27th International Conference on, pp. 291-302. IEEE, 2011.*

Funke, F., Kemper, A., & Neumann, T. (2012). Compacting transactional data in hybrid OLTP&OLAP databases. Proceedings of the VLDB Endowment, 5(11), 1424-1435.*

Kemper, Alfons, and Thomas Neumann. "HyPer: A hybrid OLTP &OLAP main memory database system based on virtual memory snapshots." In Data Engineering (ICDE), 2011 IEEE 27th International Conference on, pp. 195-206. IEEE, 2011.*

Tinnefeld, Christian, Stephan Müller, Helen Kaltegärtner, Sebastian Hillig, Lars Butzmann, David Eickhoff, Stefan Klauck et al. "Available-To-Promise on an In-Memory Column Store." In BTW, vol. 180, pp. 667-686. 2011.*

Matei, Gheorghe, and Romanian Commercial Bank. "Column-oriented databases, an alternative for analytical environment." Database Systems Journal 1, No. 2 (2010): 3-16.*

Krueger, Jens, Martin Grund, Christian Tinnefeld, Hasso Plattner, Alexander Zeier, and Franz Faerber. "Optimizing write performance for read optimized databases." In International Conference on Database Systems for Advanced Applications, pp. 291-305. Springer Berlin Heidelberg, 2010.*

* cited by examiner

COLUMN SMART MECHANISM FOR COLUMN BASED DATABASE

This patent application claims priority of CN Patent Application No. 201210544711.6 filed Dec. 14, 2012.

BACKGROUND

OLTP (Online Transactional Processing) systems and OLAP (Online Analytical Processing) systems are used by the database community. OLTP systems are typically used in transaction oriented applications where a large number of short transaction (e.g., insert, update, delete, select) are made by the application. In OLTP systems, lists of elements are stored on a disk and are cached in a main memory of a database server. OLTP systems have generally been used with row-oriented relational databases.

OLAP systems are typically used in analytics oriented applications (e.g., analytical and financial planning applications) where queries are more complex. In OLAP systems, attributes are compressed using dictionaries and multi-dimensional queries can be made. OLAP systems have generally been used with column-oriented relational databases.

Due to the advantages of each system, OLTP and OLAP systems have traditionally been separate, and applications were designed to support one environment or the other. However, in recent years, the database community has witnessed a growing interest in in-memory computing and in parallel computing technologies. These technologies have resulted in OLTP and OLAP systems being utilized on the same database. For example, OLTP and OLAP transactions have been utilized on the same column-based in-memory database (e.g., SAP® HANA Database). Such efforts have been driven by an interest in reducing the total cost and complexity of the systems.

However, because each of the OLTP and OLAP systems is designed to efficiently operate on a specific type of database, running both of the OLTP and OLAP systems on the same type of database may have some disadvantages. For example, while utilizing OLAP systems on a column based storage database provides increased efficiency, utilizing OLTP systems on such a database does not increase efficiency as compared to performance of the OLTP system on a traditional row based database. Methodologies have been proposed to improve the performance of the OLTP system on column based in-memory database (e.g., pushing down the calculation logic to the database layer where it can be performed faster). However, even with these methodologies, the application code will still include queries to access required data from the database.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

DETAILED DESCRIPTION

Embodiments of the present disclosure may provide a system and method processing an online transactional processing (OLTP) transaction on a column-based storage of a database. The method may include receiving a request of the OLTP transaction to access data on the column-based storage. A determination may be made whether a cache associated with the database includes column information for the OLTP transaction. If the cache includes the column information for the OLTP transaction, the method may include processing the OLTP transaction with the column information in the cache. If the cache does not include the column information for the OLTP transaction, the method may include selecting columns from the column-based storage of the database.

Embodiments of the present disclosure provide for a smart query optimization mechanism to minimize issuing queries to access unnecessary column information in a database. The embodiments provide for improved performance of OLTP transactions on column based databases (e.g., SAP® HANA database, but is not so limited).

Figure 1:
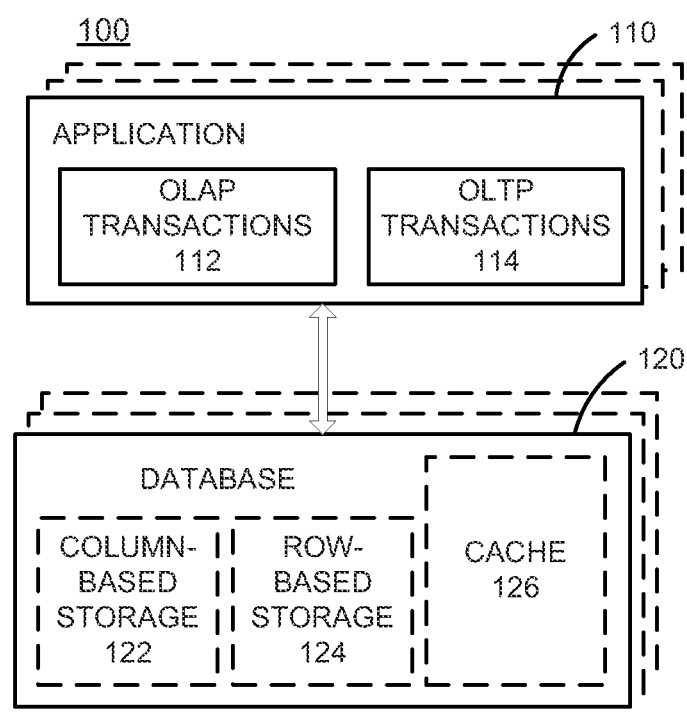
FIG. 1 illustrates an embodiment of a process for generating a feed.

FIG. 1 illustrates an embodiment of system for implementing OLTP and OLAP transactions on a database. The system 100 may include an application 110 issuing OLAP transactions 112 and OLTP transactions 114, and a database 120. Both OLTP and OLAP transactions may be processed on the database including column-based storage in an efficient manner according to the various embodiments of the present disclosure to reduce the response time of the database. For example, the response time of the database can be reduced by configuring the OLTP transaction to only read the fields of interest, when the information for the OLTP transaction is available in the cache.

In particular, OLTP transactions can be efficiently processed by having a learning mode and a learned mode. In the learning mode, all of the columns of a table may be selected based on the OLTP transaction and the information about the selected columns can be included in the cache. In the learned mode, the information in the cache can be used to process the OLTP transaction. The learning mode may be bypassed, if the information associated with the OLTP transaction is available in the cache.

The application 110 may be an application accessing information in the database 120 via the OLAP transactions 112 and/or OLTP transactions 114. The application 110 may access the database 120 to obtain information for managing and/or providing support for sales, customer relationships, inventory, operations, financials and human resources. The application 110 may be an integrated enterprise resource planning application (e.g., SAP® Business One) integrating internal and external management of information of an organization. The application 110 may access information from a plurality of database 120. A plurality of application 110 may access information from one or more databases 120.

The database 120 may be an in-memory database (e.g., SAP® HANA database) using column based storage, but is not so limited. The database 120 may be a relational database having a relational database engine. In-memory database may allow for faster computation of large data sets by keeping the data close to the computation, instead of storing the data at the application layer or sending the data between a plurality of databases.

The database 120 may include a column-based storage 122 storing relational data in columns and a row-based storage 124 storing relational data in rows. In one embodiment, the database 120 may include only column-based storage 122. The column-based storage 122 may allow for the values of the column to be stored in contiguous memory locations and the row-oriented storage may allow for the table to be stored as a sequence of records in one row.

The data in the database 120 may be accessed through different interfaces implemented by the one or more applications 110. The interfaces may include SQL, MDX, and BICS, but are not so limited. The applications 110 may issue requests using the available interfaces. The requests may be OLTP transactions and/or OLAP transactions. The request may be to access certain data in the database 120 or to perform a calculation or analysis on the data in the database 120. The calculation or analysis in response to the requests from the application 110, may be performed in the database 120, without moving the data into the application layer.

The database 120 may include a cache 126 (e.g., memory of the database 110) to store data and/or information about the data in the database 120. The cache 126 does not have to be part of the database, as shown in FIG. 1, but can be separate from the database 120. The cache 126 may maintain recently referenced information from requests to access the database 120. The cache 126 allows for such information to be maintained close to the processor. The cache may be used to store data and/or information about the data in the database 120 in response to a request to access data in the database 120. A common cache 126 may be utilized for a plurality of databases 120.

Column-based storage 122 provides increased density of information to be stored in the database 120. Requests to access the data in a column-based storage 122 result in more information being loaded in the cache 126 for processing at one time. Thus, less load actions may be required from the column-based storage 122 into the cache 126, as compared to requests in row-based storage 122. However, each time the data is accessed in the column-based storage 122, all of the columns of a table are selected. Thus, even columns of no relevance to the request may be selected and retrieved into the cache. Because such queries include columns with no relevance to the request, they may increase the response time of the database 120. The response time will significantly increase with a large number of columns.

For example, a query may request to add a sales order for a product. For such a query, information is needed of the product from the database. The query will request the whole record for the product from the database 120 using, for example, "SELECT * FROM [PRODUCT NAME]". While only unit price and weight columns may be needed to add the sales order, the record may include information for the product that is not needed for the sales order (e.g., product specifications or manufacturing schedule). Such requests in row-based storage 124 may be acceptable but may significantly increase the response time in column-based storage 122, because with column-based storage, the time cost is sensitive to the query's column count.

The query to access database 120 may be processed to determine whether the cache 126 includes column information for the query. The column information included in the cache 126 may be determined by a query optimization mechanism to learn and cache column data (e.g., filed names and/or indices) from one or more previous transaction. If the cache includes the column information for the query, then the query does not need to be processed to access all of the columns from the database 120. Thus, unnecessary columns do not need to be accessed with every query. The database 120 may be accessed in response to a query when the cache does not include the column information needed for the query.

Figure 2:
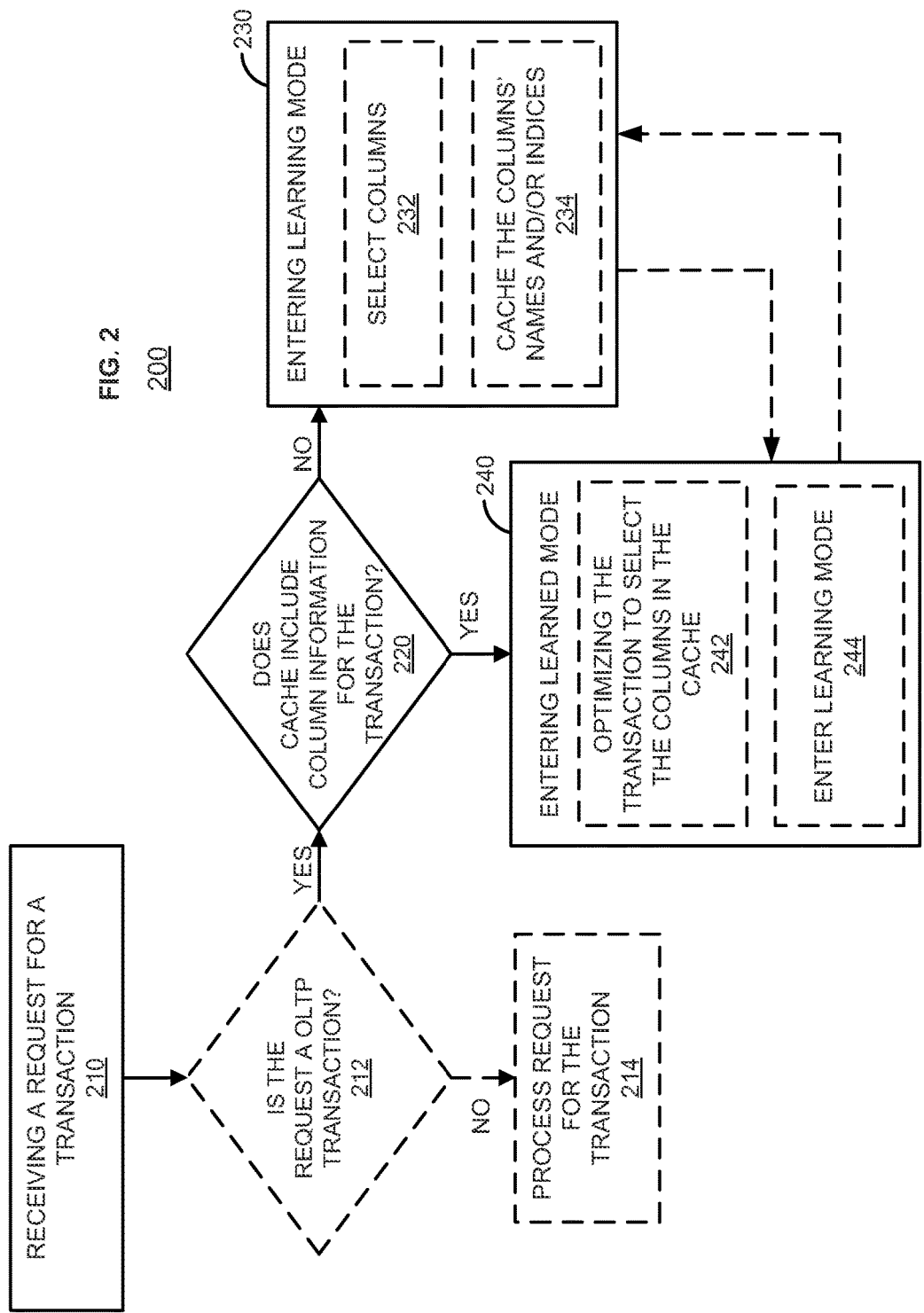
FIG. 2 illustrates a method for processing transactions to a database according to an exemplary embodiment of the disclosure.

FIG. 2 illustrates a method for processing transactions to a database according to an exemplary embodiment of the disclosure. The method 200 may be implemented on a system configured to process OLAP and OLTP transactions on in-memory database (e.g., SAP® HANA database) having a column-based storage. The method may include receiving a request for a transaction (block 210), determining whether a cache includes column information for the transaction (block 220), if the cache does not include the column information for the transaction, entering a learning mode (block 230), if the cache does include the column information for the transaction, entering a learned mode (block 240). In the learning mode, the method 200 may include selecting columns (block 232) and caching the columns' names and/or indices which are used in the transaction (block 234). In the learned mode, the method 200 may include optimizing the transaction to select the columns in the cache (block 242).

The request for a transaction (block 210) may be a request made by a user via an application to start a transaction. The request may be issued at the application layer. The transaction may be an OLTP transaction or an OLAP transaction to access data in one or more databases (e.g., database with column-based storage). A determination may be made to determine if the requested transaction is an OLTP transaction (block 212). If the request is not an OLTP transaction (e.g., an OLAP transaction), then the request for the transaction can be processed (block 214). If the request is for an OLTP transaction, then the OLTP transaction can be processed to determine whether the cache includes column information for the transaction (block 220). The request for a transaction may include a request for a plurality of transactions and each transaction can be processed individually or as a batch of transactions.

The OLTP transaction may be characterized by a large number of short transactions (e.g., SELECT, DELETE, INSERT, UPDATE). For example, the OLTP transaction may include adding a sales order or customer information, but is not so limited. In response to the request for a transaction, a query may be issued to load the data and/or data objects which are queried.

If the request is an OLTP transaction, then it may be determined whether a cache associated with the database includes column information for the transaction (block 220). The cache may include information that is loaded into the cache for processing. The cache may include columns of no relevance to a particular query. The information in the cache may be information loaded in response to one or more preceding queries. The information (e.g., table field names and/or indices) in the cache may be compared to the information needed for the OLTP transaction. Determining whether the cache includes the needed information for the transaction (block 220), may include comparing the transaction and/or queries of the request to the previous transaction and/or queries processed by the system. The cache may include the types of transaction and/or quires that were previously processes.

If the information needed for the OLTP transaction is not included in the cache, then the learning mode may be entered (block 230). In the learning mode, the columns of the table may be selected (block 232) based on the OLTP transaction. The selection may be in response to a query (e.g., SELECT*) to select all columns of the table. The selection may be made from multiple tables and all of the columns in the tables may be selected. The columns' names and/or indices which are used in the OLTP transaction may be cached (block 234) and/or associated with the OLTP transaction. All of the columns' names and/or indices selected in response to the query may be cached (block 234) and/or associated with the OLTP transaction.

If the information needed for the OLTP transaction is included in the cache, then the learned mode may be entered (block 240). In the learned mode, because the information associated with the OLTP transaction is already provided in the cache, there is no need to process a query to retrieve data (e.g., necessary data and unnecessary data) from the database. Such queries (e.g., SELECT*) to the database would take up unnecessary time and select columns that may not be needed for the OLTP transaction. Entering the learned mode, reduces time cost and computation cost by utilizing information provided in the cache. The OLTP transaction may be processed in the learned mode based on the available information in the cache.

In the learned mode, the method may include optimizing the query of the OLTP transaction (block 242). Optimizing the query of the OLTP transaction may include optimizing the query before being executed, so that only the cached columns and/or only the columns needed for the transaction are queried.

Optimizing the query may include rewriting the query. The query may be rewritten based on execution of previous transactions. The rewritten query may provide the results using the same data structure that the original query would provide. For example, when executing a query "SELECT * FROM Table1 WHERE KEY=" in a specific transaction (e.g., add sales order), the query may retrieve all of the column information of Table1 which are needed for the transaction based on a previous transaction (e.g., a transaction which was executed in a learning mode) without retrieving all of the columns of Table1. The original query may be rewritten to, for example, "SELECT Col1, Col2 . . . , FROM Table1 WHERE KEY=", where Col1, Col2 are columns needed for the transaction. The rewritten query may be sent to the database management system (DBMS). For compatibility (e.g., with the existing business logic layer), the rewritten query may return the results with the same data structure as would be returned with the original query. The columns needed for the transaction may be filled with data from the DBMS and the columns not needed for the transaction may be filled with other values (e.g., fake values, defaults values or random values). Providing the results with the same data structure, allows to improve the performance in various layers (e.g., business logic layer) without changing these layers. Some of these layers, in systems like the ERP system, are very large and would significantly increase the time and/or cost to change.

In the learned mode, an option may be included to enter the learning mode (block 244). The learning mode may be entered while in the learned mode, if it is determined that access to some column does not exist in the cache. The determination may be made when optimization of the query of the OLTP transaction (block 242) is made. The switch to the learning mode from the learned mode may be performed automatically in response to the missing information in the cache. In the learning mode, all of the columns of the table may be queried and the cache can be refreshed with the accessed columns.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hard-wired circuitry in place of, or in combination with machine readable software instructions.

Figure 3:
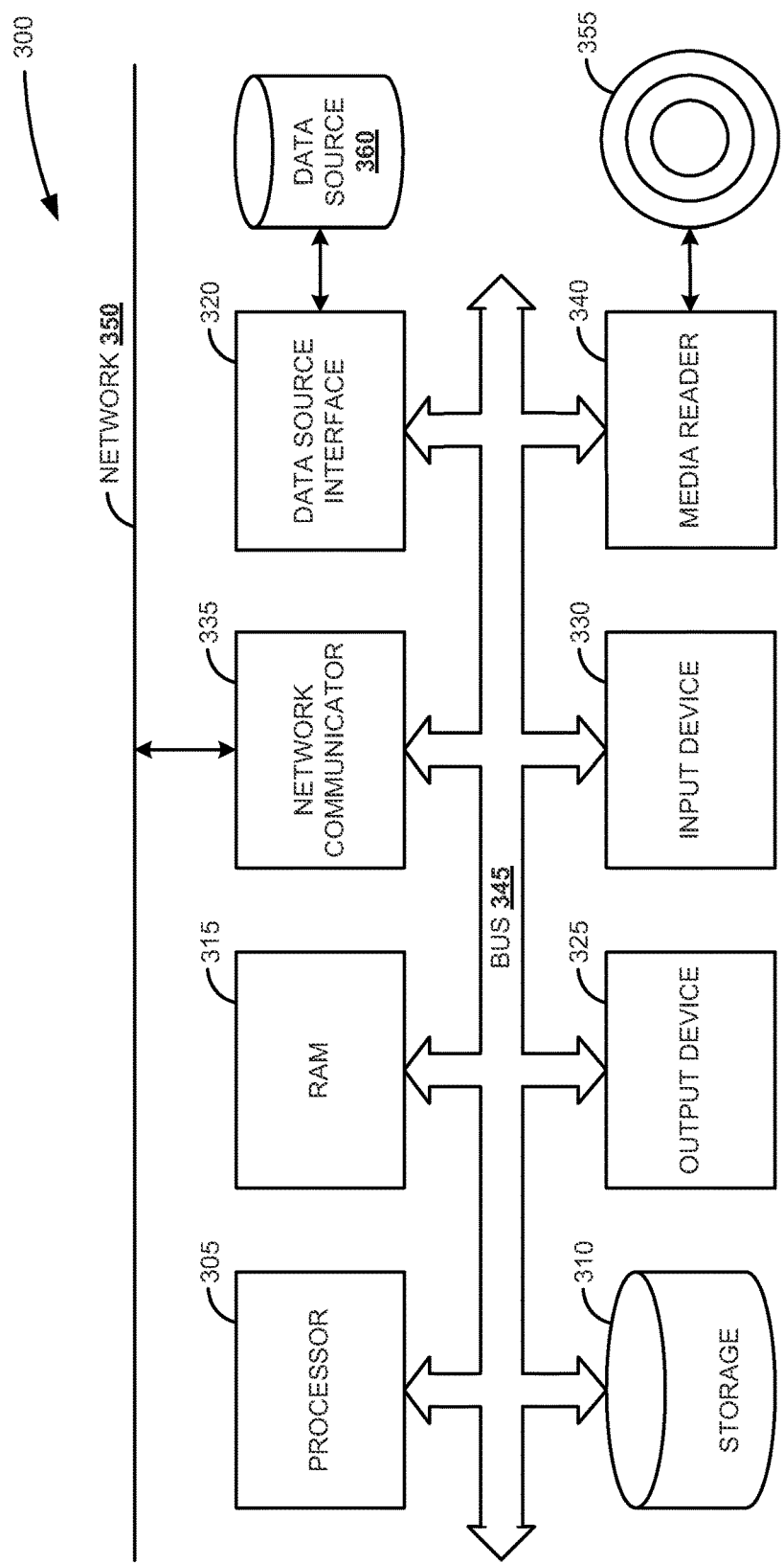
FIG. 3 is a block diagram of an exemplary computer system.

FIG. 3 is a block diagram of an exemplary computer system 300. The computer system 300 includes a processor 305 that executes software instructions or code stored on a computer readable storage medium 355 to perform the above-illustrated methods of the disclosure. The computer system 300 includes a media reader 340 to read the instructions from the computer readable storage medium 355 and store the instructions in storage 310 or in random access memory (RAM) 315. The storage 310 provides a large space for keeping static data where at least some instructions could be stored for later execution. The stored instructions may be further compiled to generate other representations of the instructions and dynamically stored in the RAM 315. The processor 305 reads instructions from the RAM 315 and performs actions as instructed. According to one embodiment of the disclosure, the computer system 300 further includes an output device 325 (e.g., a display) to provide at least some of the results of the execution as output including, but not limited to, visual information to users and an input device 330 to provide a user or another device with means for entering data and/or otherwise interact with the computer system 300. Each of these output devices 325 and input devices 330 could be joined by one or more additional peripherals to further expand the capabilities of the computer system 300. A network communicator 335 may be provided to connect the computer system 300 to a network 350 and in turn to other devices connected to the network 350 including other clients, servers, data stores, and interfaces, for instance. The modules of the computer system 300 are interconnected via a bus 345. Computer system 300 includes a data source interface 320 to access data source 360. The data source 360 can be accessed via one or more abstraction layers implemented in hardware or software. For example, the data source 360 may be accessed by network 350. In some embodiments the data source 360 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, provides calculations associated with the underlying data.

In the above description, numerous specific details are set forth to provide a thorough understanding of embodiments of the disclosure. One skilled in the relevant art will recognize, however that the various embodiments can be practiced without one or more of the specific details or with other methods, components, techniques, etc. In other instances, well-known operations or structures are not shown or described in detail to avoid obscuring aspects of the disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

The above descriptions and illustrations of embodiments of the disclosure, including what is described in the Abstract, is not intended to be exhaustive or to limit the embodiments to the precise forms disclosed. While specific embodiments of, and examples for, the embodiments are described herein for illustrative purposes, various equivalent modifications are possible within the scope of the disclosure, as those skilled in the relevant art will recognize. These modifications can be made to the embodiments in light of the above detailed description. Rather, the scope of the disclosure is to be determined by the following claims, which are to be interpreted in accordance with established doctrines of claim construction.

We claim:

1. A method comprising:
receiving a request for an online transactional processing (OLTP) transaction through an input device to access data in a column-based storage of a database contained in a data storage device, the OLTP transaction including a query to access a first set of columns in the column-based storage;
in the event a cache includes column information for the OLTP transaction, entering a learned mode;
responsive to entering the learned mode:
determining a second set of columns that are needed by the OLTP transaction, the determining including comparing the OLTP transaction to a plurality of previously processed OLTP transactions stored in the cache;
optimizing the query of the OLTP transaction to access the second set of columns in the cache, wherein the second set of columns is smaller than the first set of columns; and
processing the OLTP transaction with the column information in the cache based on the optimized query;
in the event the cache does not include the column information for the OLTP transaction, entering a learning mode and selecting columns from the column-based storage of the database, caching column names or indices relating to the selected columns, and entering the learned mode and processing the OLTP transaction with the column information in the cache,
wherein the selection of columns is based on the OLTP transaction and includes only columns necessary for the OLTP transaction; and
outputting at least a portion of a result of the OLTP transaction to an output device.

2. The method of claim 1, wherein the cache is associated with the database and the method further comprises determining whether the cache includes the column information for the OLTP transaction.

3. The method of claim 1, further comprising receiving a request for an online analytical processing (OLAP) transaction to access data in the column-based storage of the database.

4. The method of claim 1, wherein the selected columns from the column-based storage of the database includes at least one column needed with the OLTP transaction and at least one column not needed for the transaction.

5. The method of claim 1, wherein the cache includes column information from at least one previous request.

6. The method of claim 1, further comprises caching column names or indices of the columns selected from the column-based storage of the database.

7. The method of claim 2, wherein determining whether the cache associated with the database includes the column information for the OLTP transaction includes comparing the OLTP transaction with previously processed OLTP transactions.

8. A non-transitory computer readable storage medium storing one or more programs configured to be executed by a processor, the one or more programs comprising instructions for:
   receiving a request for an online transactional processing (OLTP) transaction to access data in a column-based storage of a database, the OLTP transaction including a query to access a first set of columns in the column-based storage;
   determining whether a cache associated with the database includes column information for the OLTP transaction;
   in the event the cache includes the column information for the OLTP transaction, entering a learned mode;
   responsive to entering the learned mode:
      determining a second set of columns that are needed by the OLTP transaction, the determining including comparing the OLTP transaction to a plurality of previously processed OLTP transactions stored in the cache;
      optimizing the query of the OLTP transaction to access the second set of columns in the cache, wherein the second set of columns is smaller than the first set of columns; and
      processing the OLTP transaction with the column information in the cache based on the optimized query;
   in the event the cache does not include the column information for the OLTP transaction, entering a learning mode and selecting columns from the column-based storage of the database, caching column names or indices relating to the selected columns, and entering the learned mode and processing the OLTP transaction with the column information in the cache,
   wherein the selection of columns is based on the OLTP transaction and includes only columns necessary for the OLTP transaction.

9. The computer readable storage medium of claim 8, further comprising instructions for receiving a request for an online analytical processing (OLAP) transaction to access data in the column-based storage of the database.

10. The computer readable storage medium of claim 8, wherein the selected columns from the column-based storage of the database includes at least one column needed with the OLTP transaction and at least one column not needed for the transaction.

11. The computer readable storage medium of claim 8, wherein the cache includes column information from at least one previous request.

12. The computer readable storage medium of claim 8, wherein determining whether the cache associated with the database includes the column information for the OLTP transaction includes comparing the OLTP transaction with previously processed OLTP transactions.

13. A system, comprising:
   one or more processors; and
   memory storing one or more programs for execution by the one or more processors, the one or more programs including instructions for:
      receiving a request for an online analytical processing (OLAP) transaction to access data in a column-based storage of a database;
      receiving a request for an online transactional processing (OLTP) transaction, the OLTP transaction including a query to access a first set of columns in the column-based storage;
      determining whether a cache associated with the database includes column information for the OLTP transaction;
      in the event the cache includes the column information for the OLTP transaction, entering a learned mode;
      responsive to entering the learned mode,
         determining a second set of columns that are needed by the OLTP transaction, the determining including comparing the OLTP transaction to a plurality of previously processed OLTP transactions stored in the cache;
         optimizing the query of the OLTP transaction to access the second set of columns in the cache, wherein the second set of columns is smaller than the first set of columns; and
         processing the OLTP transaction with the column information in the cache based on the optimized query;
      in the event the cache does not include the column information for the OLTP transaction, entering a learning mode and selecting columns from the column-based storage of the database, caching column names or indices of the columns selected from the column-based storage of the database, and entering the learned mode and processing the OLTP transaction with the column information in the cache,
   wherein the selection of columns is based on the OLTP transaction and includes only columns necessary for the OLTP transaction.

14. The method of claim 1, wherein the data structure contains columns not needed for the current transaction, wherein such columns are filled with at least one of random, fake, or default values.

15. The method of claim 1, wherein the request comprises a plurality of transactions, wherein each transaction can be processed individually or as a batch of transactions.

16. The method of claim 1, wherein the database is a relational database, wherein the relational database has a relational database engine.

17. The method of claim 1, wherein the transaction accesses data in a plurality of databases.

18. The method of claim 17, wherein a common cache is utilized for the plurality of databases.

19. The method of claim 1, wherein the database includes the cache.

* * * * *